United States Patent [19]
Olinger

[11] Patent Number: 5,644,904
[45] Date of Patent: Jul. 8, 1997

[54] SICKLE APPARATUS

[75] Inventor: Harvey Olinger, Huntington Beach, Calif.

[73] Assignee: Harvey and Anne Olinger Trust, Huntington Beach, Calif.

[21] Appl. No.: 423,713

[22] Filed: Apr. 17, 1995

[51] Int. Cl.$^6$ ................................. A01D 34/28
[52] U.S. Cl. .................. 56/292; 56/300; 56/307; 30/387
[58] Field of Search ................ 56/291, 292, 244, 56/245, 290, 300, 307; 30/387

[56] References Cited

U.S. PATENT DOCUMENTS

| | | |
|---|---|---|
| 391,142 | 10/1888 | Gumz . |
| 395,493 | 1/1889 | Hanson . |
| 1,200,520 | 10/1916 | Platt . |
| 1,409,507 | 3/1922 | Wilson . |
| 2,941,345 | 6/1960 | Schaeffer . |
| 3,006,129 | 10/1961 | Sayre . |
| 3,029,584 | 4/1962 | Johnson . |
| 3,034,276 | 5/1962 | Hester . |
| 3,217,473 | 11/1965 | Lawrie . |
| 3,242,659 | 3/1966 | Dunlap . |
| 3,641,752 | 2/1972 | Ipbach ................... 56/244 X |
| 4,086,748 | 5/1978 | Witt ........................... 56/98 |
| 4,164,835 | 8/1979 | Conte ......................... 56/291 |
| 4,611,401 | 9/1986 | Piller ......................... 30/387 |
| 4,656,819 | 4/1987 | Pearson ..................... 56/291 |
| 4,815,265 | 3/1989 | Guinn et al. ............... 56/297 |
| 5,261,217 | 11/1993 | Allen ......................... 56/244 |

FOREIGN PATENT DOCUMENTS

| 4201045 | 7/1993 | Germany ................. 56/244 |
|---|---|---|

*Primary Examiner*—Terry Lee Melius
*Attorney, Agent, or Firm*—Fulwider Patton Lee & Utecht, LLP

[57] ABSTRACT

A sickle apparatus employing an endless cutter mechanism is provided wherein its modular construction allows the size of the apparatus to be readily tailored to variously sized equipment. Traveling blades are attached to the hollow pin drive chain by fasteners extending through the hollow pins to facilitate repair with a minimum of downtime. The use of liner material prevents a pivoting or twisting of the chain to stabilize the traveling blades while minimizing wear and tear. A positive attack of the traveling blade relative the fixed blade provides for a positive cutting action.

19 Claims, 2 Drawing Sheets

SICKLE APPARATUS

BACKGROUND

The present invention generally relates to mechanized harvesting and mowing equipment used on tractors or combines and, more particularly, pertains to improvements to power sickles that employ an endless cutter type mechanism.

Endless cutters offer substantial advantages over conventional reciprocating designs. In general terms, such cutters utilize a closed loop of traveling cutting blades in concert with a series of fixed cutting blades. The closed loop is continually transported in one direction only and at constant speed past the fixed blades such that each of the traveling blades repeatedly engages each of the stationary blades in a sequential fashion to provide a continuous cutting action. The smooth operation of this type of mechanism alleviates the tremendous vibrational forces inherent in reciprocating systems which can be destructive to not only the components of the cutter mechanism itself, but to any machinery which may be subject to the vibration. Additionally, an endless mower configuration is free from the noise that results directly from the reciprocation of components in a conventional system which typically presents a considerable nuisance that can substantially wear down and impair an operator who may be subjected to such noise for an extended period of time. Finally, endless mower systems do not suffer from the power losses inherent in a reciprocating system which must repeatedly accelerate and decelerate the substantial mass associated with the reciprocating componentry.

While the various endless cutting mechanisms that have, to date, been devised do overcome the disadvantages inherent in reciprocating systems they, nonetheless, suffer from a number of shortcomings. A feature lacking in the presently known endless cutter systems is any capability for enabling the size of the cutter to be relatively easily tailored to variously sized equipment. It would be most desirable for substantially the same apparatus to be adaptable to a small tractor, as well as to a large combine without the need for redesign and by employing substantially the same components.

In endless cutter systems employing a drive chain to transport the traveling blades past the fixed blades, it is essential that the position of each traveling blade is sufficiently controlled so that a proper cutting action results upon engaging each fixed blade. However, it is also important to minimize friction encountered by the chain in order to reduce wear and tear and minimize power losses. A satisfactory solution addressing both of these problems has not been incorporated in heretofore known endless cutter systems. A further source of friction and the consequential inefficiencies resulting therefrom is the speed at which heretofore used blade configurations are required to engage one another in order to achieve a proper cutting action. The geometry of previously used blades have employed a negative attack angle wherein the proximal ends of the cutting surfaces of each pair of blades engage prior to their distal ends. This has the tendency to push the material to be cut out from between the blades thereby requiring either increased blade speed or vehicle speed to overcome.

A further disadvantage of previously disclosed endless cutter systems is the necessity to substantially tear down the mechanism in order to effect simple repairs, such as the replacement of high wear items. For example, replacement of a blade in systems in which the traveling blade comprises an integral component of the drive chain requires that the tension in the chain first be relieved, that the chain be disassembled and possibly completely removed from the cutter to facilitate detachment of the faulty blade, followed by the installation of a new blade, and reassembly and retensioning of the chain. Such a labor intensive procedure, aggravated by the possibility that such repair may have to be performed in a shop rather than in the field, results in extended downtime which is most undesirable, especially during the time pressures in the harvest season. An endless cutter type sickle mechanism is therefore needed that overcomes the above set forth disadvantages of presently known systems.

SUMMARY OF THE INVENTION

The sickle apparatus of the present invention overcomes the disadvantages associated with heretofore known endless cutter systems. More particularly, the device employs a modular design that is easily expandable from small tractor applications to significantly larger dimensions appropriate for use on large combines. Additionally, the quick repair of dulled or damaged blades is provided for, easily allowing for their replacement in the field with only a minimum of down time. Furthermore, the blade configuration that is employed serves to reduce the speed at which the sickle must operate in order to ensure an efficient cutting action thereby reducing power and energy requirements. Finally, a significant reduction of internal friction is achieved by the manner in which the positioning of the traveling blades is controlled which further enhances the operating efficiency of the system while reducing wear and tear.

The apparatus of the present invention employs a cutter bar having continuous drive chain mounted thereon which is powered by a drive sprocket and tensioned by a radially spaced idler sprocket. The distance between such sprockets determines the width of the swath that is cut and is a function of the number of identical intermediate cutter bar sections that are interposed therebetween. The drive chain is guided in its path between the sprockets in plastic lined grooves wherein the use of the liner material stabilizes the drive chain to control the position of the traveling blades attached thereto while significantly reducing friction. Use of a self-lubricating plastic for such purpose substantially eliminates any maintenance requirements for such components.

A series of traveling cutting blades is attached to the drive chain, each traveling blade having a sharpened surface extending along its leading edge. Use of a hollow pin drive chain allows each blade to be simply bolted thereto by fasteners extending through the interior of a pair of adjacent chain pins. This configuration allows the replacement of a blade to be accomplished without the need to disassemble or even detension the drive chain.

The traveling blades are transported past a series of fixed blades that project forwardly from the cutter bar. Each fixed blade is of two part construction wherein a cutting element is attached to the cutter bar at its proximal end and joined to a stabilizer member at its distal tip. The stabilizer member, in turn, extends proximally and is also attached to the cutter bar. The gap in between the cutting element and the stabilizer member allows the running blade to pass therethrough. The cutting element has a sharpened edge that initially extends substantially in parallel to the direction of travel of the running blade and then curves to a direction substantially perpendicular thereto. The running blade has a positive attack angle wherein its distal tip initially engages the distal end of the cutting element of the fixed blade to form an aperture of ever decreasing size. This serves to draw the material to be cut into the blade and thereby achieves a positive cutting action.

These and other features and advantages of the present invention will become apparent from the following detailed description of a preferred embodiment which, taken in conjunction with the accompanying drawings, illustrates by way of example the principles of the invention.

DETAILED DESCRIPTION OF PREFERRED EMBODIMENT

The drawings depict a preferred embodiment of the sickle apparatus of the present invention. The device is attachable to a vehicle which provides power for its operation and serves to transport the device across the vegetation to be harvested.

Figure 1:
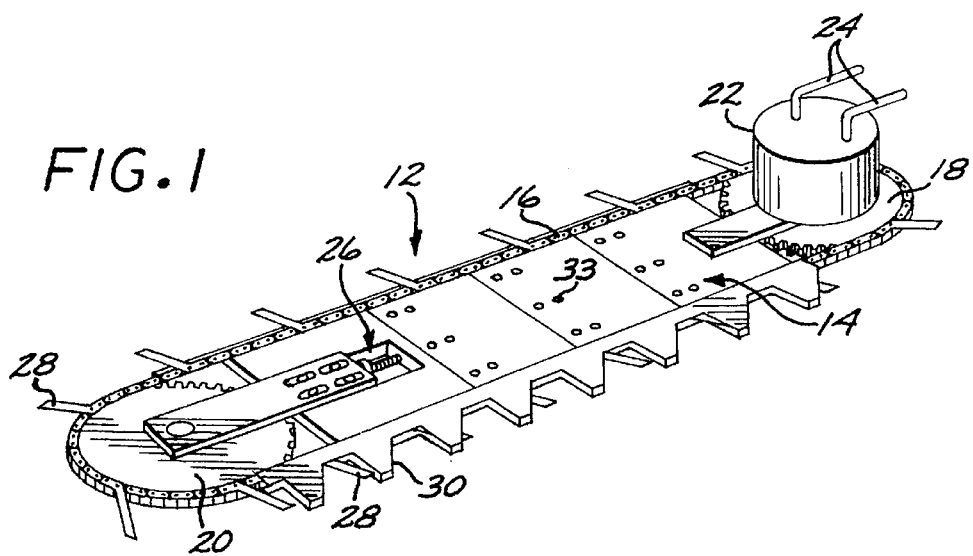
FIG. 1 is a perspective view of the sickle apparatus of the present invention.

FIG. 1 illustrates the sickle apparatus 12 of the present invention generally consisting of a cutter bar 14 having a pair of sprockets 18, 20 rotatably supported on either end. The driven sprocket 18 may be powered by any of a variety of means. The illustration semi-schematically shows a hydraulic motor 22 employed for such purpose which converts pressurized fluid supplied and returned through conduits 24 into powered rotation. Alternatively, an electric motor may be employed as could a small internal combustion engine or the device may be powered by a direct mechanical linkage extending from the tractor or combine. Idler sprocket 20 is positioned on the opposite end of the cutter bar to support a drive chain 16 wherein adjustment mechanism 26 enables the position of the idler sprocket to be adjusted relative to the driven sprocket 18 so as to tension the chain 16. A series of traveling blades 28 are attached to the drive chain and are transported about the periphery of the device upon actuation of hydraulic motor 22. A series of fixed blades 30 are affixed to the leading edge of cutter bar 14.

Figure 2:
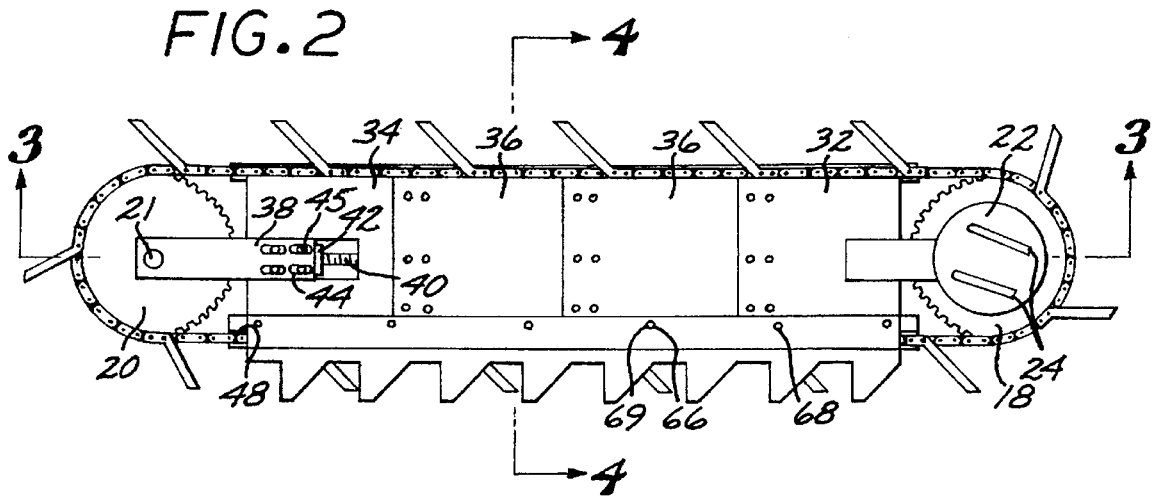
FIG. 2 is a top plan view of the apparatus shown in FIG. 1.

FIG. 2 is a top plan view of the device shown in FIG. 1. This figure more clearly illustrates the fact that the cutter bar 14 consists of a drive section 32 and a tail section 34, with a plurality of intermediate sections 36 interposed therebetween. The drive section includes a bearing set 19 for rotatably supporting drive sprocket 18, while tail section includes a bearing set 21 for rotatably supporting idler sprocket 20. Tail section 34 additionally includes adjustment mechanism 26 to allow for longitudinally shifting the position of the bearing set and hence the idler sprocket relative to the tail section. Intermediate sections 36 are each identical in configuration and are interchangeable. As is visible in FIG. 3, which is an enlarged sectional view of FIG. 2 taken along lines 3—3, each section is attached to the adjacent section by a lap joint secured by a series of fasteners 33, each comprising a countersunk nut and bolt combination. The length of the cutter bar is therefore a direct function of the number of intermediate sections interposed between the drive and tail section. The use of two intermediate sections 34 is shown for illustrative purposes only. Any number of intermediate sections may be fitted and may be deleted altogether wherein driver section 32 is directly attached to tail section 34. Two support channels 48, 50 extend along the edges of the drive and tail sections, as well as each intermediate section which, upon assembly of the various sections, form continuous channels extending along the leading and trailing edges of the cutter bar. This configuration allows different sizes of cutter bars to be easily manufactured without the necessity to redesign any components or the need to manufacture a special set of components for each size application.

Figure 3:
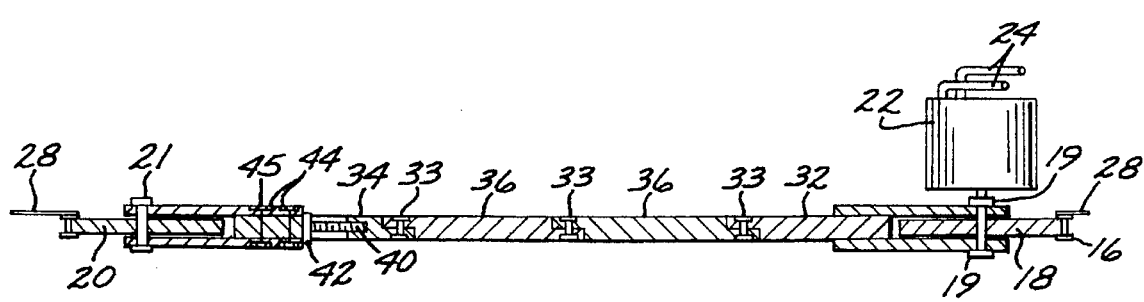
FIG. 3 is an enlarged cross-sectional view taken along lines 3—3 of FIG. 2.

Visible in FIG. 3 is the mechanism that facilitates the variable positioning of the idler sprocket 20, and, consequently, the tensioning of the chain 16. The idler sprocket 20 is supported by a bearing set 21 which, in turn, is affixed to a support housing that is longitudinally slidable relative the tail section 34. A threaded shaft 40 rigidly affixed to the tail section, is slidably received within the support housing. Rotation of adjustment nut 42 which is threadedly received on shaft 40 causes the entire idler sprocket housing to shift relative the cutter bar. Once in position, set screws 44 extending through slotted holes 45 are tightened to maintain the housing and hence idler sprocket in position.

Figure 4:
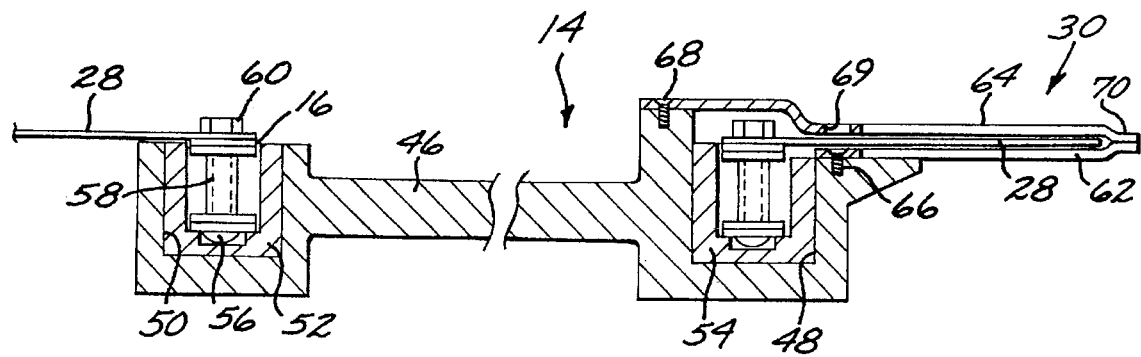
FIG. 4 is a further enlarged and sectioned cross-sectional view taken along lines 4—4 of FIG. 2.

The cross-sectional view of FIG. 4 serves to illustrate the manner in which the chain is supported within the channels formed in the cutter bar segments, as well as the configuration of both the traveling cutter blades 28, as well as the fixed cutter blades 30. Each cutter bar segment consists of an aluminum extrusion 46 that includes two longitudinal support channels 48, 50 arranged in a spaced relation. Each support channel is lined with an ultra high molecular weight (UHMW) polyethylene resin 52, 54 which serves to maintain the chain 16 in position while reducing friction and wear. Such UHMW plastics have a molecular weight greater than $4 \times 10^6$ g/mole are self lubricating, extrudible, inherently anti-adhesive, have extremely high impact strength, and are not affected by moisture. Such material is available under the trademark of LENNITE. The described configuration substantially eliminates wear to the chain, while serving to precisely position the chain to, in turn, stabilize the positioning of the traveling blades. This figure additionally illustrates the manner in which the traveling 28 cutting blades are attached to the drive chain. The drive chain 16 consists of a hollow pin-type configuration wherein a mounting bolts 56 are passed through the interior of the hollow pin 58 to securely bolt each traveling blade thereto. A preferred fastener consists of a bolt extending through the hollow pin of the chain which is threadedly received within a threaded hole formed in the traveling blade. A lock nut 60 is tightened thereto to positively prevent any loosening of the assembly. Additionally visible in FIG. 4 is the configuration of the fixed blade 30. Each fixed blade consists of a cutting element 62 that is rigidly affixed to the extrusion 46 by fasteners 66. A stabilizing member 64 extends from the tip of each cutting element back to the housing for attachment via fastener 68. A hole 69 formed in the stabilizing member provides access to the fastener 66 therebelow. The tips 70 of the cutting element and the stabilizing members are preferably joined by a spot weld. The spacing between such sub-components allow the traveling blades 28 to pass therethrough.

FIG. 2 illustrates the relative spacing of the traveling and fixed blades. It is to be noted that the spacing between the fixed blades is slightly different from that of the running blades to achieve a continuous phase shift. As a result, only a minimum of blade pairs, and preferably only a single pair of blades, engage at any given moment.

Figure 5:
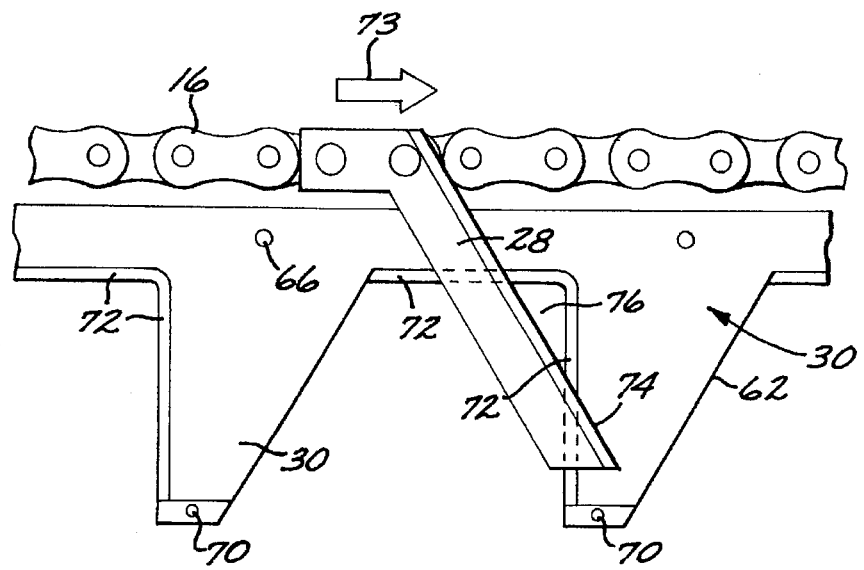
FIG. 5 is enlarged plan view showing the interaction between traveling blade and the cutting surfaces of the fixed blades.

FIG. 5 illustrates a traveling blade 28 engaging the cutting element 62 of a fixed blade 30. The stabilizer members have been cut away to provide a clear view of such interaction. Each fixed blade has a sharpened edge 72 that initially extends in parallel with the direction of travel 73 of the traveling blade and then turns perpendicular thereto to extend to near the distal tip of said blade. The traveling blade has a single sharpened edge 74 that extends at approximately a 25 degree angle toward the direction of travel to provide a positive attack angle. As is shown in FIG. 5, as the traveling blade engages the fixed blade and passes through its interior, an ever decreasingly sized aperture 76 positively forces the material to be cut into the sharpened edges.

In operation, the modular design of the system of the present invention allows the apparatus to be readily adapted to any size equipment. Upon determination of the required width of the cutter bar 14, the number of intermediate sections 32 that are necessary are determined and assembled. The appropriate length of chain 46 between the drive section 32 and the tail section 34 is then fitted about the two sprockets 18, 20, after which an appropriate member of sections of fixed blades 30 are attached to the cutter bar. Finally, traveling blades 28 are attached to the chain 16 to complete assembly of the device. A hydraulic motor 22 for driving the drive chain is preferred, as such configuration allows the speed of the rotation of the drive chain to be readily adjusted by simply adjusting the pressure of the hydraulic fluid supplied to the hydraulic motor. Additionally, provisions may easily be incorporated in such system to detect a jam wherein a perceived spike in hydraulic pressure would serve to automatically shut the system down or, at least, to send a warning to the operator.

As drive sprocket 18 is rotated to drive the chain 16 along the cutter bar 14, and as the cutter bar is transported through the material to be harvested, each traveling blade 28 repeatedly captures a clump of material as the distal ends of the traveling and fixed blades engage and then forces the material into the sharpened edges, as the aperture between such blades closes. The stabilizer element 64 maintains the cutting element 62 in position and also assists in properly positioning the material to be harvested so as to yield a clean cut. The UHMW plastic liner prevents the chain from pivoting or twisting to maintain the proper positioning of the traveling blades thereby further assisting in the proper engagement of the blade elements. The disparate spacing between the fixed blades and the traveling blades ensure that only one set of blades engage one another at any given time. This more evenly distributes the loads the device is subject to thereby reducing shock loading and minimizing friction.

In the event a traveling blade needs to be replaced, the chain is advanced to a position to provide clear access to the defective blade. Lock nuts 60 and bolts 56 are removed to release the blade while attachment of a new blade is simply the reverse of the removal procedure. There is no need to remove, disassemble, or even detension the chain. Such repair is easily accomplished in the field in a matter of minutes.

While a particular form of the invention has been illustrated and described, it will also be apparent to those skilled in the art that various modifications can be made without departing from the spirit and scope of the invention. For instance, any power source may be utilized to rotate the drive pulley, and a variety of different blade configurations and geometries may be adapted to the system. Accordingly, it is not intended that the invention be limited except by the appended claims.

What is claimed is:

1. A sickle apparatus, comprising:
   an elongated cutter bar having a leading edge and a trailing edge with a sprocket rotatably disposed at either end;
   a plurality of fixed blades attached to said cutter bar so as to project forwardly from said leading edge;
   a continuous multi-link drive chain extending about said sprockets and along said leading edge wherein said links are hingedly attached to one another with hollow pins; and
   a traveling blade attached to said chain via at least one fastener extending through one of said hollow pins, wherein said blade is oriented so as to engage said fixed blades to effect a cutting action upon rotation of one of said sprockets and whereby attachment and detachment of said blade is accomplished without disassembly of said chain.

2. The sickle apparatus of claim 1 wherein said cutter bar comprises a drive section rotatably supporting a drive sprocket and a tail section rotatably supporting said idler sprocket wherein said sections are configured to either attach directly to one another or to receive one or more intermediate sections therebetween.

3. The sickle apparatus of claim 2 wherein said intermediate sections are all identical to one another.

4. The sickle apparatus of claim 3 wherein said sections are joined together via lap joints.

5. The sickle apparatus of claim 2 wherein said tail section comprises a mechanism for adjusting the longitudinal separation between the drive sprocket and idler sprocket.

6. The sickle apparatus of claim 5 wherein said fixed blades have sharpened edges extending both in parallel to and at a substantially right angle to the direction of travel of said traveling blade.

7. The sickle apparatus of claim 2 wherein said drive, tail, and intermediate sections have a groove formed therein to guide said chain between said sprockets.

8. The sickle apparatus of claim 7 wherein said groove is lined with a plastic material so as to guide said chain between said sprockets.

9. The sickle apparatus of claim 8 wherein said plastic material comprises a self lubricating UHMW polyethylene plastic.

10. The sickle apparatus of claim 8 wherein said traveling blade engages said fixed blades with a positive angle of attack.

11. A sickle apparatus, comprising:
    a cutter bar drive section having a leading edge and rotatably supporting a drive sprocket;
    a cutter bar tail section having a leading edge, supporting an idler sprocket, and attachable to said drive section so as to align leading edges;
    an adjustment mechanism for altering the longitudinal position of the idle sprocket relative to the tail section;
    a cutter bar intermediate section having a leading edge insertable in between said drive and tail section so as to align said leading edges;
    a plurality of fixed blades attached to said leading edges; and
    a drive chain extending about said sprockets having traveling blades attached thereto that engage said fixed blades to effect a cutting action upon rotation of said drive sprocket whereby the length of said cutter bar is determined by the number of intermediate sections inserted in between said drive and tail sections.

12. The sickle apparatus of claim 11 wherein adjoining edges of said drive, tail, and intermediate sections are formed to provide lap joints.

13. The sickle apparatus of claim 11 wherein said drive chain comprises a plurality of links joined to one another by hollow pins and wherein said traveling blades are attached to said chain via fasteners extending through said hollow pins.

14. The sickle apparatus of claim 13 wherein said traveling blades have a threaded hole formed therein and a bolt extends through said hollow pin to threadedly engage said threaded hole.

15. The sickle apparatus of claim 11 wherein said drive, tail, and intermediate sections have a channel formed along their leading edges for receiving said chain and wherein said channel is lined with a plastic.

16. The sickle apparatus of claim 15 wherein said plastic comprises ultra high molecular weight plastic.

17. The sickle apparatus of claim 11 wherein said traveling and fixed blades are configured and oriented to provide a positive angle of attack.

18. The sickle apparatus of claim 17 wherein said fixed blade has a sharpened edge extending along the direction of travel of said traveling blade and a sharpened edge extending substantially perpendicular to said direction of travel.

19. A sickle apparatus, comprising:

a cutter bar drive section having a leading edge and rotatably supporting a drive sprocket;

a cutter bar tail section having a leading edge, supporting an idler sprocket, and attachable to said drive section so as to align leading edges;

a cutter bar intermediate section having a leading edge insertable in between said drive and tail section so as to align said leading edges;

a plurality of fixed blades wherein each of said blades has a proximal end that is attached to a first surface extending along the leading edge of said cutter bar section and a distal end that is attached to a stabilizer member that, in turn, is attached, to a second surface of extending along said cutter bar section; and a drive chain extending about said sprockets having traveling blades attached thereto that engage said fixed blades to effect a cutting action upon rotation of said drive sprocket wherein said traveling blades pass between said fixed blade and said stabilizer member and wherein said traveling and fixed blades are configured and oriented to provide a positive angle of attack and wherein said fixed blade has a sharpened edge extending along the direction of travel of said travel blade and a sharpened edge extending substantially perpendicular to said direction of travel whereby the length of said cutter bar is determined by the number of intermediate sections inserted in between said drive and tail sections.

* * * * *